Patented Aug. 7, 1928.

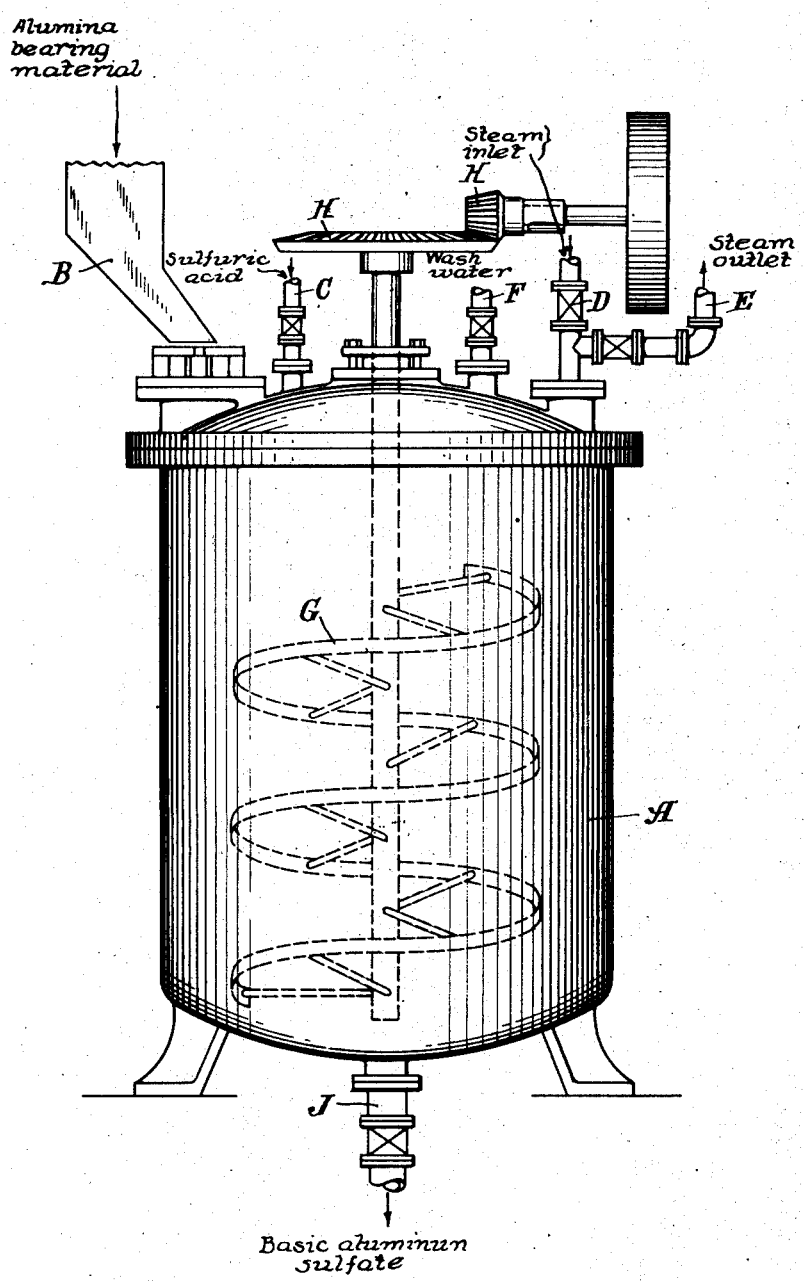

1,679,366

UNITED STATES PATENT OFFICE.

ROY MACKAY MEIKLEJOHN, OF FLUSHING, NEW YORK, ASSIGNOR TO GENERAL CHEMICAL COMPANY, OF NEW YORK, N. Y., A CORPORATION OF NEW YORK.

METHOD OF MAKING ALUMINUM SULPHATE.

Application filed January 6, 1926, Serial No. 79,532, and in Canada October 2, 1925.

The invention relates to the manufacture of aluminum sulphate from clay or the like and sulphuric acid. The object of the invention is to secure important yields and conversion and to effect economies, all as hereinafter more fully described.

A further object of this invention is to obtain a product in the form in which it is capable of commercial use, i. e., a product which gives no acid reaction, and in the preferred embodiment of the product, indicates the presence of approximately 0.4% free alumina.

The general practice of manufacturing aluminum sulphates comprises mixing calcined clay, kaolin, or equivalent material with sulphuric acid of 36° Bé. in an open vessel. If a stronger acid is used, the mixture becomes too thick to stir with the result that in the practical manufacture of the aluminum sulphates an acid stronger than 36° Bé. is not used.

In bauxite practice acids of a higher strength were employed, but in view of the fact that bauxite contains approximately 30% water, the effective strength of the sulphuric acid in this instance was not in excess of 36° Bé. acid.

I have now discovered that advantages of a very substantial character can be secured by conducting the reaction with sulphuric acid, strong as compared with 36° Bé. acid and providing for maintenance of necessary high temperature conditions during the terminal part of the reacting period, the temperature in other respects being maintained to an extent necessary to keep the mass above 160° C. throughout the conduct of the entire digestion process. In order to carry out this process in a convenient manner, it is preferably conducted in a closed vessel which, due to the necessary temperature conditions, is maintained under pressure. In carrying out this new process, the clay or kaolin, prepared in the usual manner, is introduced into a digester and mixed with the requisite quantity of sulphuric acid of a strength in excess of 36° Bé. and preferably an acid of such strength that the ratio of 100% $H_2SO_4$ to the total water in the mix approximates or is greater than 1:1, although improved results can be obtained by the new process even though the ratio is less than that above stated as the preferred ratio; the lowest satisfactory ratio being about 1:1.3. In a convenient commercial carrying out of the new process there is introduced to the digester, after the same has been charged with the reacting materials as stated, steam sufficient to give a temperature to start the reaction. Steam under forty pounds pressure may be used for this purpose. A vigorous reaction then occurs which develops sufficient heat and pressure to maintain the desired conditions and the temperature will rise to a point corresponding approximately to 125 to 150 pounds steam gauge steam pressure, i. e., about 178° C. or above. At this temperature decomposition is rapid and substantially complete conversion is obtained. As the temperature in the digester tends to fall below the temperature most favorable to the reaction, said temperature is maintained or supplemented preferably by steam under pressure of 125 pounds or thereabouts or by other suitable heating media. I have found that while increasing the temperature above about 178° C., i. e., about 125 pounds gauge steam pressure, increases the decomposition to some extent, it does not greatly aid the reaction, consequently I have given this as the preferred commercial operating temperature. However, it is to be understood that improved results over ordinary practice may be obtained at lower temperatures, provided that the temperature be maintained above about 160° C., i. e., about 75 pounds gauge steam pressure, particularly during the terminal period of the reaction. By thus maintaining the temperature as noted the mix in the digester is prevented from solidifying and is kept in liquid condition throughout the reaction. The requisite temperature conditions can be effected either by introducing the steam into the mix or by applying heat externally. When the process is carried on in this manner, the reaction is completed in a very short period of time, approximating, for example, one to two hours as contrasted with four to six hours of the prior open tank practice.

It will be observed that under the conditions stated, a temperature condition is maintained in the digester which is hot enough to be effective even at the very end of the reactive period of the sulphuric acid and the clay. During the process the acid becomes gradually weaker but this condition is somewhat counteracted by the initial use of a relatively strong acid. It will thus be noted that the initial use of a relatively strong acid is a factor in enabling substantially complete decomposition to be effected and also contributes to cause the final product to be devoid of free sulphuric acid and to be recoverable as a basic product. In the illustrative example of the present process, described hereinafter, approximately 0.4% of free alumina is present in the product, which consequently is the commercial basic sulphate of aluminum. The process is of particular advantage in treating uncalcined clay, although it is equally applicable to the treatment of alumina-bearing material generally, including calcined clay, kaolin and bauxite.

The present invention possesses numerous advantages. In the first place the sulphuric acid and the clay material can be mixed in combining proportions with but a slight excess of clay as contrasted with a mix in which there is a large excess of clay. Although some steam under pressure is used, the amount is small and, speaking broadly, practically no costly heat from an extraneous source is required. The solution in the digester is of such character as to allow the solids or muds to settle easily. If a weak sulphuric acid is used in a pressure digester, there is a tendency to the formation of a colloidal condition of silicates, which may be of such an extent as to render the process unavailable for practical use, whereas with acids of the higher strengths there is apparently a partial dehydration of the silicates which tends to assure the favorable conditions required in the settling stage. Moreover, when using acids of weaker strengths, it is not possible to obtain a satisfactory decomposition in a reasonable operating time in order to obtain a basic product without the use of a large excess of the clay material which again would result in a diminution of the decompositon yield of the mix as a whole.

Referring to the drawing, A designates the closed vessel in which the reaction takes place, B the charging spout for the clay, C the acid inlet, D the valved steam inlet, E the valved steam outlet, G an interior stirring device operated by the gearing H, and J the outlet for the product of the reaction. The pipe marked F serves to allow for the addition of a solution by equalizing the pressure and communicates with a pressure tank above containing hot wash liquors or hot water allowing the liquor to flow into the digester while the digester is still under its pressure. After the clay is introduced into the vessel A the charging hole is closed. Acid of a strength in excess of 36° Bé., preferably 45° Bé. (or 50° to 60° Bé.) is introduced at C, until the requisite reacting proportions of clay and acid with a slight excess of clay—say 5–7%—are established in the vessel A.

The initial strength of the acid charged into the digester will vary somewhat with the nature of the alumina-bearing material to be treated, as the water content of different clays, bauxites, etc., varies considerably. For instance, bauxite will ordinarily contain about 25–30% of water (present both as free moisture and as water of hydration), whereas clays generally contain only about 15% water. In any case an acid of sufficient strength is used such that the ratio by weight of the chemical compound sulphuric acid (i. e. 100% $H_2SO_4$) to the total water present in the mix (i. e. the water present in the alumina-bearing material plus the water of dilution in the acid) will approximate or be greater than 1:1.3 and preferably be 1:1.

Having introduced the charge into the digester, the valve of the acid line C is then shut off, thereby closing the acid line. The mixing device G is revolved by actuating the driving elements H, steam is introduced through D until the vessel A is under approximately 40 pounds steam pressure and maintained until the reaction starts, after which the steam valve in the line D is shut off. A vigorous reaction ensues, and increases the pressure (i. e., temperature) in the digester A. As this pressure tends to fall below 125 pounds, additional steam under such pressure is introduced sufficient to maintain the proper temperature in A to the end of the reaction period. At the expiration of about one to three hours the pressure is relieved and the product withdrawn into settling tanks, wherein, on dilution of the solution, the settling takes place readily.

The strength of the sulphuric acid in the mix, and likewise the ratio of acid to water, will of course decrease as the reaction proceeds due to the fact that the acid is progressively used up in combining with the alumina to form aluminum sulphate and water. Consequently the strength of acid, and ratio of acid to water, specified in the following claims is intended to refer to the strength of the acid initially, calculated or determined with reference to all of the water introduced into the mix, including the water of dilution in the original acid, water of dilution added originally, or subsequently during the reaction in the form of steam, etc., and water present in the alumina bearing material in the form of free moisture or water of composition.

In the apparatus above described the mixing device G can be dispensed with and its function performed by the introduction of the steam into the mass of the reacting material and numerous other variations in detail may obviously be made without departing from the invention.

I claim:

1. The process of manufacturing aluminum sulphate which consists in causing a reaction between alumina-bearing material and sulphuric acid under conditions where the ratio of 100% $H_2SO_4$ contained in the mix, to the total water present in the mix is greater than 1:1.3 and in which the reaction is so conducted that the mix is continuously maintained at a temperature above 160° C. and above the solidifying point thereof.

2. The process of manufacturing aluminum sulphate which consists in causing a reaction between alumina-bearing material and sulphuric acid under conditions where the ratio of 100% $H_2SO_4$ contained in the mix, to the total water present in the mix is greater than 1:1.3 and in which the reaction is so conducted that the mix is maintained at a temperature above 160° C. and above the solidifying point thereof during the closing period of the reaction.

3. In the art of making aluminum sulphate, the improvement which comprises causing reaction in a closed vessel between an alumina-bearing material and sulphuric acid of a strength greater than 36° Bé. such that substantially complete decomposition is effected and that the resulting product is basic, and establishing temperature conditions appropriate to maintain the reacting materials in a liquid state and above 160° C. throughout the period of the reaction.

4. In the art of making aluminum sulphate, the improvement which comprises causing reaction between an alumina-bearing material and sulphuric acid of such strength that substantially complete decomposition is effected and that the resulting product is basic and establishing and maintaining a temperature of approximately 178° C. throughout the reaction to preserve a liquid state in the reacting materials.

5. The process of manufacturing aluminum sulphate which consists in causing a reaction between substantially combining proportions of alumina-bearing material and sulphuric acid under conditions where the ratio of 100% $H_2SO_4$ contained in the mix to the total water present in the mix is greater than 1:1.3 and in which the reaction is so conducted that the mix is continuously maintained at a temperature above 160° C. and above the solidifying point thereof.

6. The process of manufacturing aluminum sulphate which consists in causing a reaction between substantially combining proportions of alumina-bearing material and sulphuric acid under conditions where the ratio of 100% $H_2SO_4$ contained in the mix to the total water present in the mix is greater than 1:1.3 and in which the reaction is so conducted that the mix is maintained at a temperature above 160° C. and above the solidifying point thereof during the closing period of the reaction.

7. In the art of making aluminum sulphate, the improvement which comprises causing reaction between an alumina-bearing material and sulphuric acid of such strength that the ratio of 100% $H_2SO_4$ contained in the mix to the total water present in the mix is above 1:1.3 while maintaining the mix continuously at approximately 178° C. and in a liquid condition.

8. The process of manufacturing aluminum sulphate, which consists in causing a reaction between an alumina-bearing material and sulfuric acid under conditions where the ratio of 100% $H_2SO_4$ contained in the mix to the total water present in the mix is greater than 1:1.3, and in which the reaction is so conducted that the mix is maintained at about 178° C., and in a liquid condition throughout the closing period of the reaction.

9. The process of manufacturing aluminum sulphate, which consists in causing a reaction between an alumina-bearing material and sulphuric acid under conditions where the ratio of 100% $H_2SO_4$ contained in the mix to the total water present in the mix is substantially 1:1 while maintaining the temperature of the mix above 160° C., and above the solidifying point thereof throughout the closing period of the reaction.

10. The process of manufacturing aluminum sulphate, which consists in causing a reaction between an alumina-bearing material and sulphuric acid under conditions where the ratio of 100% $H_2SO_4$ contained in the mix to the total water present in the mix is equal to or greater than 1:1 while maintaining the mix in liquid condition and at a temperature at or above approximately 178° C. during the terminal period of the reaction.

11. The process of manufacturing aluminum sulphate, which consists in causing a reaction between an alumina-bearing material and sulphuric acid under conditions where the ratio of 100% $H_2SO_4$ contained in the mix to the total water in the mix is equal to or greater than 1:1 while continuously maintaining the mix in liquid condition and at a temperature at or above approximately 178° C.

12. The process of manufacturing aluminum sulphate, which consists in causing a reaction between clay, and sulphuric acid of a strength, when added, of above 36° Bé., while maintaing the temperature of the mix during the terminal period of the reaction above 160° C., and while maintaining the mix in liquid condition throughout the reaction.

13. The process of manufacturing aluminum sulphate, which consists in causing a reaction between clay, and sulphuric acid of a strength, when added, of above 36° Bé., while maintaining the temperature of the mix continuously above 160° C. and above the solidifying point thereof.

14. The process of manufacturing aluminum sulphate, which consists in causing a reaction between clay, and sulphuric acid of a strength, when added, of 45° Bé., or above, while maintaining the temperature of the mix continuously at approximately 178° C. or above, and above the solidifying point thereof.

In testimony whereof I hereunto set my hand.

ROY MACKAY MEIKLEJOHN.